United States Patent
Garcia

(10) Patent No.: US 9,932,967 B2
(45) Date of Patent: Apr. 3, 2018

(54) METHOD FOR SETTING AN OUTPUT VOLTAGE LEVEL OF A WIND POWER PLANT

(71) Applicant: VESTAS WIND SYSTEMS A/S, Aarhus N (DK)

(72) Inventor: Jorge Martinez Garcia, Aarhus N (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 366 days.

(21) Appl. No.: 14/680,378

(22) Filed: Apr. 7, 2015

(65) Prior Publication Data

US 2015/0211493 A1 Jul. 30, 2015

Related U.S. Application Data

(63) Continuation of application No. 12/934,936, filed as application No. PCT/EP2010/051103 on Jan. 29, 2010, now Pat. No. 9,030,043.

(Continued)

(51) Int. Cl.
| | |
|---|---|
| *H01F 38/00* | (2006.01) |
| *F03D 9/00* | (2016.01) |
| *F03D 7/00* | (2006.01) |
| *H02P 9/14* | (2006.01) |
| *F03D 17/00* | (2016.01) |
| *F03D 9/25* | (2016.01) |

(52) U.S. Cl.
CPC ............... *F03D 9/005* (2013.01); *F03D 7/00* (2013.01); *F03D 9/257* (2017.02); *F03D 17/00* (2016.05); *H02P 9/14* (2013.01); *Y02E 10/72* (2013.01); *Y10T 307/398* (2015.04); *Y10T 307/50* (2015.04); *Y10T 307/511* (2015.04); *Y10T 307/62* (2015.04); *Y10T 307/642* (2015.04); *Y10T 307/718* (2015.04)

(58) Field of Classification Search
CPC .............................. F03D 9/005; Y10T 307/50
USPC ........................................................ 307/43
See application file for complete search history.

(56) References Cited

U.S. PATENT DOCUMENTS 4,326,236 A * 4/1982 McNair ................. E21B 19/008
                                                              188/158
6,555,991 B1    4/2003 Zettel et al.
(Continued)

FOREIGN PATENT DOCUMENTS

DE    102005052010 A1    5/2007
EP         1512869 A1    3/2005
(Continued)

OTHER PUBLICATIONS

G. Brauner, Netzanbind von Windkraftanlagen, Springer Verlag, Wien, vol. 116, No. 7/08, 1999.

(Continued)

*Primary Examiner* — Alfonso Perez Borroto
(74) *Attorney, Agent, or Firm* — Patterson + Sheridan, LLP

(57) ABSTRACT

The present disclosure addresses the problem of ensuring that wind turbine voltage levels within a wind power plant do not exceed predetermined overvoltage and/or undervoltage protection levels. In particular, the present disclosure relates to adjustment of an output voltage level of a wind power plant in order to protect an internal power plant grid from overvoltages.

20 Claims, 3 Drawing Sheets

Related U.S. Application Data

(60) Provisional application No. 61/148,114, filed on Jan. 29, 2009.

(56) References Cited

U.S. PATENT DOCUMENTS

| | | | |
|---|---|---|---|
| 7,256,566 B2 * | 8/2007 | Bhavaraju | G05F 1/67 320/101 |
| 7,346,462 B2 | 3/2008 | Delmerico | |
| 8,041,465 B2 * | 10/2011 | Larsen | H02J 3/16 700/287 |
| 8,234,015 B2 | 7/2012 | Bech et al. | |

FOREIGN PATENT DOCUMENTS

| | | |
|---|---|---|
| EP | 1519040 A1 | 3/2005 |
| EP | 1841037 A2 | 10/2007 |
| WO | 2004/025803 A1 | 3/2004 |
| WO | 2008/125163 A1 | 10/2008 |

OTHER PUBLICATIONS

International Search Report for PCT/EP2010/051103, dated Jun. 4, 2010.

* cited by examiner

METHOD FOR SETTING AN OUTPUT VOLTAGE LEVEL OF A WIND POWER PLANT

CROSS-REFERENCE TO RELATED APPLICATIONS

This application is a continuation of co-pending U.S. patent application Ser. No. 12/934,936, filed Jan. 29, 2011, which is a national stage application of PCT/EP2010/051103, filed Jan. 29, 2010, which claims priority to U.S. provisional patent application Ser. No. 61/148,114, filed Jan. 29, 2009, and Denmark application Serial No. PA 2009 00134, filed Jan. 29, 2009. The aforementioned related patent applications are herein incorporated by reference in their entirety.

BACKGROUND

Field of the Invention

The present invention relates to a method for ensuring that wind turbine voltage levels within a wind power plant do not exceed a predetermined security level.

Description of the Related Art

Internal power grids of wind power plants connect individual wind turbines of a wind power plant to a point of common coupling—the latter being the point where power is fed onto a power supply grid from the wind power plant.

In order to do this correctly the impedance of the internal power grid between each of the wind turbines of the plant and the point of common coupling has to be taken into consideration.

As illustrated in FIG. 1, and explained in more details later, the wind turbine experiencing the highest impedance to the point of common coupling needs to generate the highest wind turbine voltage level in order to compensate for voltage drops in the internal power grid. However, by following this approach the highest wind turbine voltage level within the plant may become dangerously close to, or even exceed, an upper voltage level with the risk of damaging the internal grid. Moreover, a long time exposure to a voltage level being lower than the nominal voltage level could result in damages to the equipment. This is due to higher currents in order to keep the power level constant.

The voltage profiles of wind turbines connected to the internal power grid depend on the impedance values and the apparent power flowing through the internal power grid.

It may be seen as an object of embodiments of the invention to provide a method that ensures that a predetermined voltage level within the wind power plant is not exceeded.

It may be seen as a further object of embodiments of the present invention to provide a method that ensures that an overvoltage level and/or an undervoltage level within the wind turbine plant is not exceeded.

SUMMARY

It has been found by the present inventor(s) that by implementing embodiments of the present invention internal power grids of wind power plants can be effectively protected.

So, in a first aspect the present invention relates to a method for setting an output voltage level of a wind power plant comprising a plurality of wind turbines being operatively connected to a plant power grid, the wind turbines being adapted to supply individual wind turbine voltage levels to the plant power grid in order to compensate for grid impedances, the method comprising the steps of determining a first wind turbine voltage level among a number of wind turbines, and setting the output voltage level of the wind power plant in accordance therewith.

It is an advantage of embodiments of the present invention that voltage levels of internal power grids of wind power plants can maintain sufficient margins to overvoltage and/or undervoltage protection levels. By following the idea underlying the present invention damage to internal power plant grids due to overvoltage levels can be avoided.

In order to determine the highest available voltage level within a wind power plant the wind turbine voltage level of each wind turbine of the plant may be determined. This may be accomplished either by measurements or by calculations. By following this approach the lowest available voltage level is also determined.

The wind power plant output voltage level may be set to differ from a voltage level of a point of common coupling by an amount being smaller than or equal to a difference between the highest wind turbine voltage level and the voltage level of a point of common coupling. The point of common coupling is the point where the wind power plant feeds power into an external power supply grid to which consumers are connected.

In one embodiment of the present invention the wind power plant output voltage level is set to differ from the voltage level of the point of common coupling by an amount being equal to approximately half of the difference between the highest wind turbine voltage level and the voltage level of a point of common coupling.

As an example, the wind power plant may feed electrical energy into a 110 kV power supply grid. Thus, the voltage at a point of common coupling (PCC), Vpcc, equals 110 kV. The wind power plant voltage, Vpp, may for example be in the order of around 30 kV. Thus, a power transformer is needed in order to match Vpp with Vpcc.

However, it should be noted that since Vpcc is fixed and since a power transformer has a non-negligible intrinsic impedance that varies with the amount of power injected into the power supply grid, the power plant voltage, Vpp, needs to be varied with the amount of power injected into the power supply grid. Thus, power plant voltage, Vpp, will be shifted upwards and downwards depending on the amount of power injected into the power supply grid.

According to the present invention the level of Vpp may be shifted in order to avoid that individual wind turbine voltage levels within the wind power plant exceed predetermined overvoltage and/or undervoltage protection levels. Since Vpcc should be kept constant at a given level (for example 110 kV) the transformer ratio should be variable. One way of implementing a variable transformer ratio is to use a transformer comprising a tap changer for changing the transformer ratio for adjustments between Vpp and Vpcc.

In another embodiment of the present invention the highest and lowest available voltage levels from wind turbines of the plant may be used to calculate the wind power plant output voltage. For example, the wind power plant output voltage may be lowered relative to the power supply grid voltage by an amount being equal to half of the difference between the highest and lowest available voltage levels.

In yet another embodiment weighting factors may be applied by multiplication to each of the wind turbine voltages in order to calculate the new voltage set point for the voltage level at the point of common coupling.

The wind power plant output voltage level may be set to be lower than the voltage level of the point of common coupling. To comply with this the wind turbine voltage level of each wind turbine is lowered accordingly. In order to match the power supply grid voltage at the point of common coupling appropriate means for converting the wind power plant output voltage level to a voltage level that matches a voltage level of a point of common coupling may be provided. Such means for converting the wind power plant output voltage level to a voltage level that matches the voltage level of a point of common coupling may comprise a transformer optionally with a variable ratio between primary and secondary windings. A variable ratio between primary and secondary windings facilitates that the wind power plant output voltage may be shifted if demands so require.

In a second aspect, the present invention relates to a method for setting a common output voltage level of a group of wind turbines comprising a plurality of wind turbines being operatively connected to a local power grid, the wind turbines being adapted to supply individual wind turbine voltage levels to the local power grid in order to compensate for local grid impedances, the method comprising the steps of determining a first wind turbine voltage level among a number of wind turbines, and setting the common output voltage level of the group of wind turbines in accordance therewith.

The wind turbine voltage level of each wind turbine may be determined so as to determine the highest wind turbine voltage level among the available wind turbine voltage levels.

In the second aspect of the present invention the group of wind turbines may form part of a wind power plant. Similar to the first aspect of the present invention the common output voltage level of the group of wind turbines may be changed, such as lowered, when the highest wind turbine voltage level exceeds a predetermined level. This predetermined level may be defined as a percentage of an overvoltage or undervoltage protection level.

In terms of implementation the method according to the second aspect may be implemented following the same design route as discussed in connection with the first aspect of the present invention.

In a third aspect the present invention relates to a wind power plant comprising control means for setting an output voltage level of said wind power plant, the wind power plant comprising a plurality of wind turbines being operatively connected to a plant power grid, the wind turbines being adapted to supply individual wind turbine voltage levels to the plant power grid in order to compensate for grid impedances, the control means comprising means for determining the highest wind turbine voltage level among a number of wind turbines, and means for setting the output voltage level of the wind power plant in accordance therewith.

The means for setting the output voltage level of the wind power plant may comprise means for setting and providing voltage control signals to each of the plurality of wind turbines forming the wind power plant, wherein each of said voltage control signals is a representative of a wind turbine voltage level to be generated by a given wind turbine.

In a fourth aspect the present invention relates to a control arrangement for setting a common output voltage level of a group of wind turbines comprising a plurality of wind turbines being operatively connected to a local power grid, the wind turbines being adapted to supply individual wind turbine voltage levels to the local power grid in order to compensate for local grid impedances, the arrangement comprising means for determining the highest wind turbine voltage level among a number of wind turbines, and means for setting the common output voltage level of the group of wind turbines in accordance therewith.

Again, the means for setting the output voltage level of the group of wind turbines may comprise means for setting and providing voltage control signals to each of the plurality of wind turbines forming the group of wind turbines, wherein each of said voltage control signals is a representative of a wind turbine voltage level to be generated by a given wind turbine.

BRIEF DESCRIPTION OF THE DRAWINGS

The present invention will now be explained in further details with reference to the accompanying figures, wherein.

Figure 1:
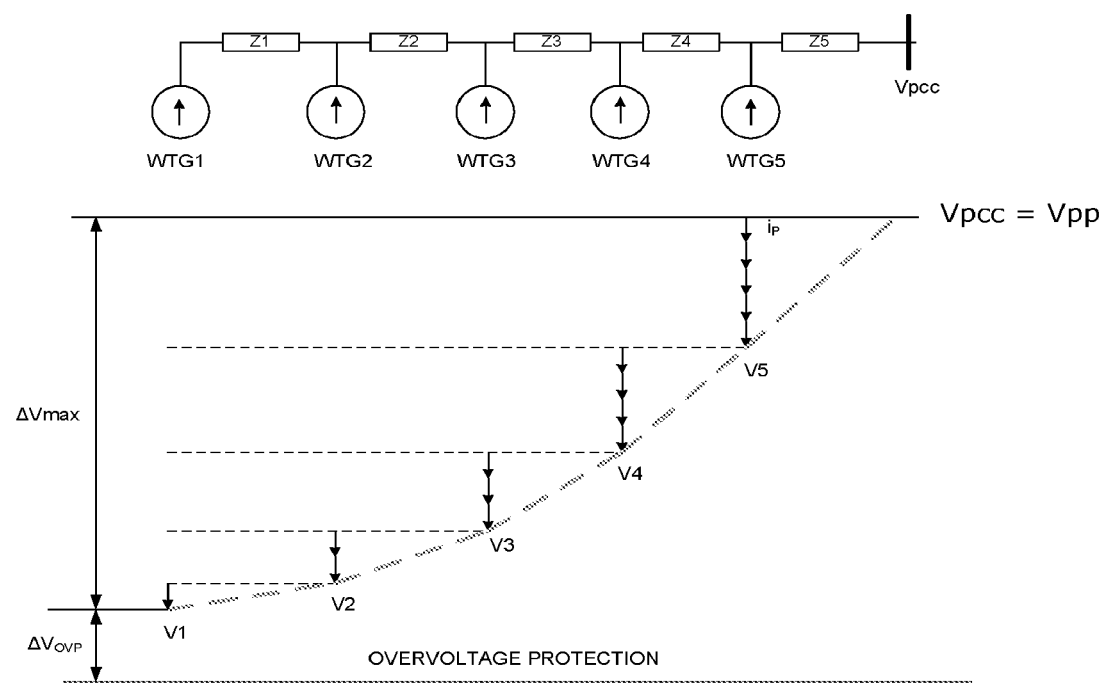
FIG. 1 shows a prior art method.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE DRAWINGS

The principle underlying the present invention is applicable to entire wind power plants as well as sub-groups of wind turbines within a wind power plant.

FIG. 1 illustrates a known method for compensating for impedances in an internal power plant grid. As depicted in FIG. 1 five wind turbines generators, WTG1-WTG5, are operatively connected to an internal power plant grid. The power plant grid is connected to an external power supply grid (not shown) at a point of common coupling PCC. At this point of common coupling the voltage level of the plant should match the voltage level of the power supply grid. This voltage is denoted Vpcc.

In order to compensate for grid impedances Z1-Z5 the generated wind turbine voltages V1-V5 from the respective ones of WTG1-WTG5 will typically be as illustrated in FIG. 1 where WTG5 generates the lowest voltage and WTG1 generates the highest voltage, the difference between the latter and the voltage level at the PCC, Vpcc, being denoted ΔVmax in FIG. 1.

To protect the internal power plant grid against overvoltages a margin of $\Delta V_{OVP}$ is added to ΔVmax. Thus, if the power plant grid voltage reaches a level of $\Delta Vmax+\Delta V_{OVP}$ above Vpcc the internal power grid may be damaged. The same procedure could be applied for overvoltage protection in relation to damages to devices.

The present invention aims at avoiding that a maximum and/or minimum allowed voltage level within a wind power plant is reached, or even exceeded thus preventing damages to the equipment within the wind power plant.

Figure 2:
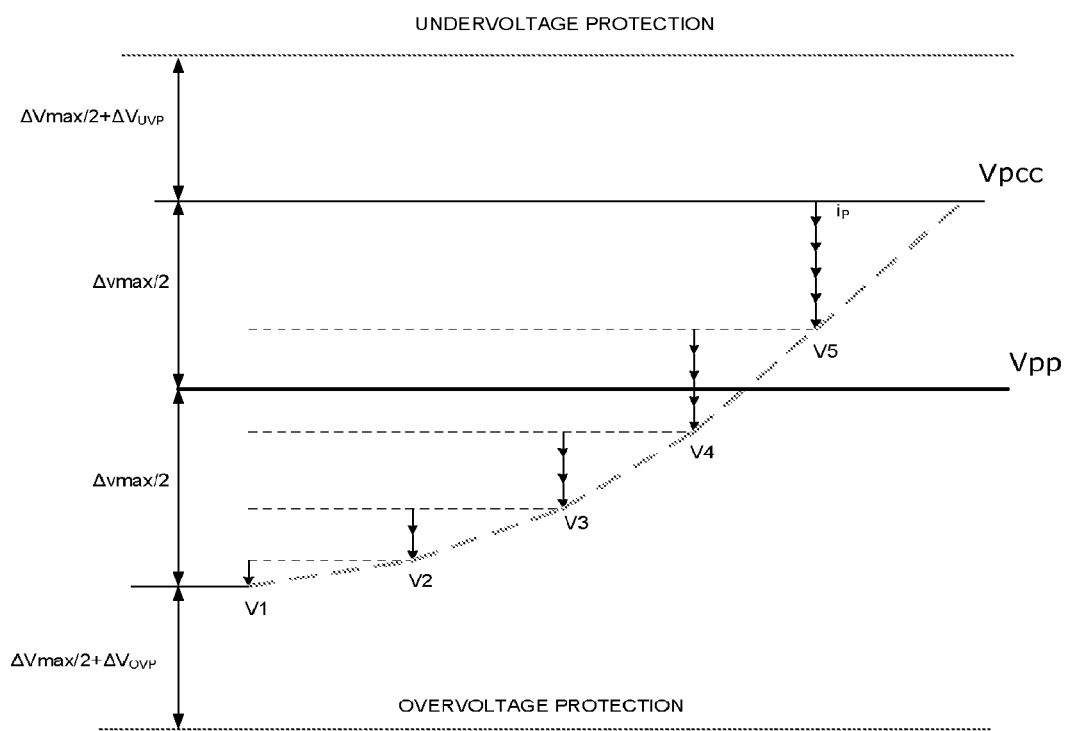
FIG. 2 shows an embodiment of the present invention.

An embodiment of the present invention is depicted in FIG. 2. As seen, the output voltage of the wind power plant, Vpp, has be lowered by ΔVmax/2 so that the difference between Vpcc and Vpp equals ΔVmax/2. However, it should be noted that the difference between Vpcc and Vpp may be chosen differently, i.e. chosen to be different from ΔVmax/2.

By displacing Vpp by an amount of ΔVmax/2 an increased margin to the overvoltage protections levels is provided.

In the embodiment illustrated in FIG. 2 the margin to the overvoltage protection level has been increased by an amount of ΔVmax/2. On the other hand the margin to the undervoltage protection level has been reduced by an amount of ΔVmax/2. However, the margins to the voltage protection levels are more evenly distributed compared to known methods.

Various different schemes may be applied to shift Vpp. These various schemes may be of dynamic or static nature. In fact, the scheme may be of adaptive nature so as to adjust to dynamic variations of a power supply grid.

As an example, the wind turbine generators of the plant providing the highest and the lowest output voltages may be used to calculate a mean value that can be used as an input parameter to a control system. Alternatively, the output voltages of the wind turbine generators of the plant can be weighted by applying weight factors and multiply these factors with respective ones of the wind turbine voltages. The weight factors can be derived from the impedance between the point where Vpp is measured and each individual wind turbine generator. The impedance values can be based on actual measurements or on calculations based on cable and transformer impedances.

In order to connect properly to a power supply grid Vpp needs to be transformed to a voltage level matching Vpcc. To achieve this, a suitable transformer can be applied. Often the transformer has a tap changer which can be used to change the transformer ratio for adjustments between Vpp and Vpcc. Depending on site specific parameters the range of which the transformer ratio can be adjusted may vary.

In summary the present invention relates to an idea that addresses the problem of avoiding that wind turbine voltage levels within a wind power plant exceed predetermined overvoltage and/or undervoltage protection levels. In particular, the present invention relates to shifting of an output voltage level of a wind power plant in order to protect an internal power plant grid against overvoltages.

In terms of real numbers the following voltage levels may be applicable:

$V_{pp} = 30$ kV=1 p.u.

$\Delta V_{max} = 1.1$ p.u.

$\Delta V_{OVP} = 1.12$ p.u.

$V_{pcc} = 110$ kV.

Obviously a power transformer is required to match Vpp with Vpcc. Since Vpp is variable and Vpcc should be kept constant at 110 kV the transformer ratio should be variable. As previously mentioned, one way of implementing a variable transformer ratio is to use a transformer comprising a tap changer for changing the transformer ratio for adjustments between Vpp and Vpcc. It should be noted that the above-mentioned voltage levels only serve as an example, and they may, obviously, be chosen differently.

Figure 3:
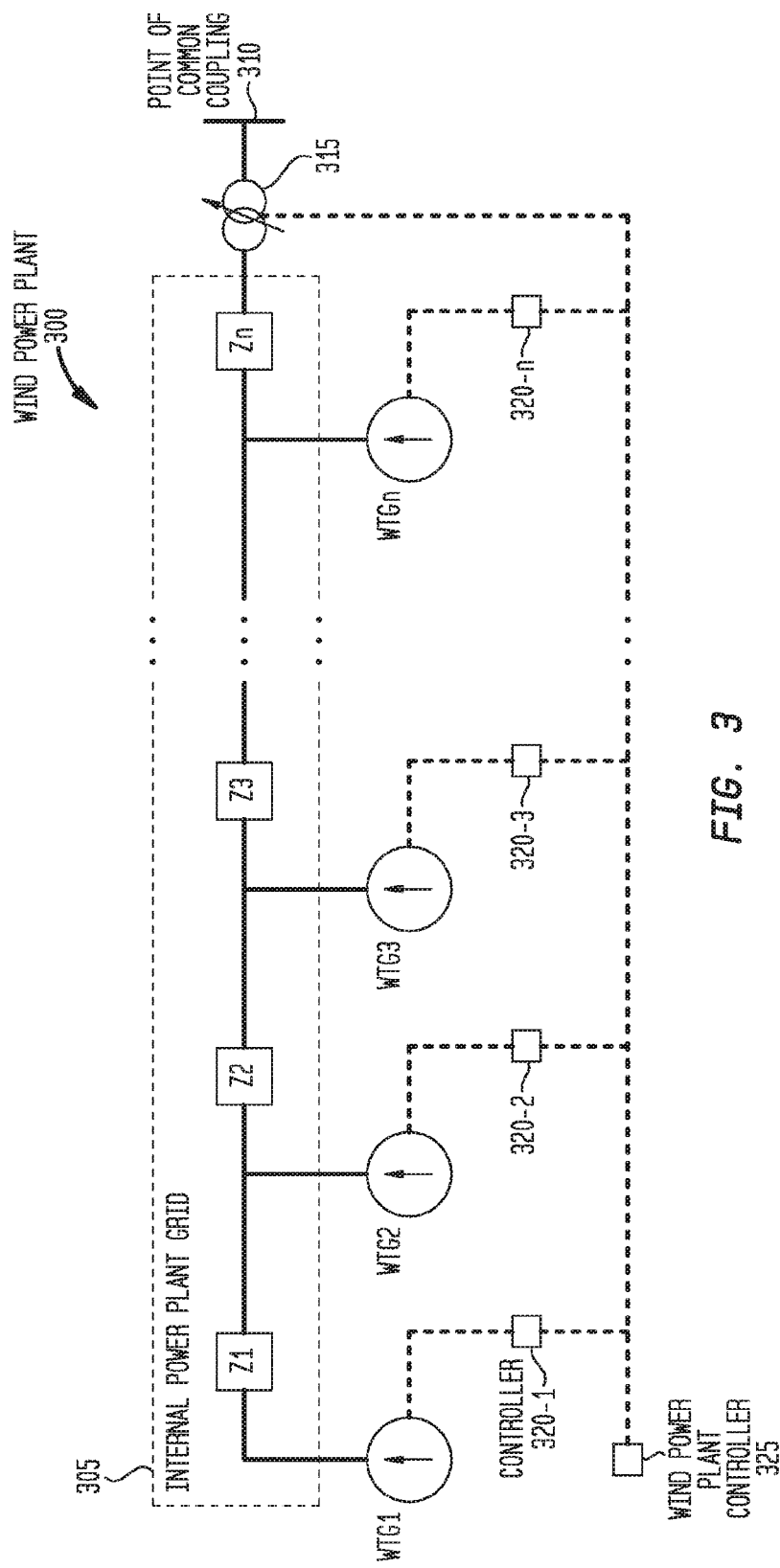
FIG. 3 shows an example wind power plant, according to one embodiment.

FIG. 3 shows an example wind power plant 300, according to one embodiment. The wind power plant 300 comprises a plurality of wind turbine generators WTG1, WTG2, WTG3, . . . , WTGn coupled with an internal power plant grid 305. The internal power plant grid 305 may be coupled with a point of common coupling 310 through an optional variable transformer 315. Each wind turbine generator WTG1, WTG2, WTG3, . . . , WTGn is communicatively coupled with a respective controller 320-1, 320-2, 320-3, . . . , 320-n. A wind power plant controller 325 may be communicatively coupled with the controllers 320-1, 320-2, 320-3, . . . , 320-n, and with the variable transformer 315.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

What is claimed is:

1. A method for setting an output voltage level of a wind power plant comprising a plurality of wind turbines operatively connected with a plant power grid, the method comprising:
   determining, at a first output voltage level of the wind power plant, a plurality of wind turbine voltage levels generated by the plurality of wind turbines, wherein the plurality of wind turbine voltage levels reflects a compensation for grid impedances of the plant power grid;
   determining a largest generated wind turbine voltage level of the plurality of wind turbine voltage levels; and
   setting the output voltage level of the wind power plant to a second output voltage level different than the first output voltage level, wherein a value of the second output voltage level is determined based on the largest generated wind turbine voltage level.

2. The method of claim 1, wherein determining the plurality of wind turbine voltage levels comprises determining a respective wind turbine voltage level for each of the plurality of wind turbines.

3. The method of claim 2, further comprising:
   determining a mean voltage level from the largest generated wind turbine voltage level and a smallest generated wind turbine voltage level of the plurality of wind turbine voltage levels,
   wherein the second output voltage level is determined based on the determined mean voltage level.

4. The method of claim 2, wherein weighting factors are applied to the plurality of wind turbine voltage levels, and wherein the second output voltage level is determined based on the weighted wind turbine voltage levels.

5. The method of claim 2, further comprising:
   determining the second output voltage level to differ from a voltage level at a point of common coupling by an amount less than or equal to a difference between the largest generated wind turbine voltage level and the voltage level at the point of common coupling.

6. The method of claim 5, wherein the second output voltage level is determined to differ from the voltage level at the point of common coupling by an amount approximately half of the difference between the largest generated wind turbine voltage level and the voltage level at the point of common coupling.

7. The method of claim 5, wherein the second output voltage level is determined to be less than the voltage level at the point of common coupling.

8. The method of claim 5, further comprising:
converting the second output voltage level to match the voltage level at the point of common coupling.

9. The method of claim 8, wherein converting the second output voltage level to match the voltage level at the point of common coupling comprises changing a variable ratio between primary and secondary windings of a transformer.

10. A method for setting a common output voltage level of a plurality of wind turbines operatively connected with a local power grid, each wind turbine configured to generate, for a first common output voltage level, a respective wind turbine voltage level to compensate for local grid impedances, the method comprising:
determining a largest generated wind turbine voltage level of the wind turbine voltage levels generated by the plurality of wind turbines; and
setting the common output voltage level to a second common output voltage level different than the first output voltage level, wherein a value of the second common output voltage level is determined based on the largest generated wind turbine voltage level.

11. The method of claim 10, wherein determining the largest generated wind turbine voltage level comprises determining the respective wind turbine voltage level for each of the plurality of wind turbines.

12. The method of claim 10, wherein the plurality of wind turbines form part of a wind power plant.

13. The method of claim 11, wherein setting the common output voltage level to the second common output voltage level is responsive to determining that the largest generated wind turbine voltage level exceeds a predetermined level.

14. The method of claim 13, wherein setting the common output voltage level to the second common output voltage level comprises decreasing the common output voltage level responsive to determining that the largest generated wind turbine voltage level exceeds the predetermined level.

15. The method of claim 13, wherein the predetermined level is defined as a percentage of one of an overvoltage and an undervoltage protection level.

16. A wind power plant, comprising:
a plurality of wind turbines operatively connected with a plant power grid having an output voltage level, each wind turbine configured to generate, for a first output voltage level of the plant power grid, a respective wind turbine voltage level to compensate for grid impedances; and
a controller coupled with the plurality of wind turbines and operable to:
determine a largest generated wind turbine voltage level of the wind turbine voltage levels generated by the plurality of wind turbines; and
set the output voltage level of the wind power plant to a second output voltage level different than the first output voltage level, wherein a value of the second output voltage level is determined based on the largest generated wind turbine voltage level.

17. The wind power plant of claim 16, wherein determining the largest generated wind turbine voltage level comprises determining the wind turbine voltage level of each of the plurality of wind turbines.

18. The wind power plant of claim 17, wherein the controller is further operable to:
determine a mean voltage level from the largest generated wind turbine voltage level and a smallest generated wind turbine voltage level of the plurality of wind turbine voltage levels, wherein the second output voltage level is determined based on the determined mean voltage level.

19. The wind power plant of claim 17, wherein weighting factors are applied to the plurality of wind turbine voltage levels, and
wherein the second output voltage level is determined based on the weighted wind turbine voltage levels.

20. The wind power plant of claim 17, wherein determining the largest generated wind turbine voltage level includes at least one of measuring and calculating the generated wind turbine voltage levels of each of the plurality of wind turbines.

* * * * *